United States Patent [19]

Valyi

[11] 4,207,134

[45] * Jun. 10, 1980

[54] APPARATUS FOR THE PREPARATION OF HOLLOW PLASTIC ARTICLES

[76] Inventor: Emery I. Valyi, 5200 Sycamore Ave., Riverdale, N.Y. 10471

[ * ] Notice: The portion of the term of this patent subsequent to Jun. 29, 1993, has been disclaimed.

[21] Appl. No.: 911,359

[22] Filed: Jun. 1, 1978

Related U.S. Application Data

[60] Continuation-in-part of Ser. No. 641,638, Dec. 17, 1975, Pat. No. 4,115,494, which is a division of Ser. No. 479,287, Jun. 14, 1974, Pat. No. 3,970,419, which is a continuation-in-part of Ser. No. 473,580, May 28, 1974, Pat. No. 3,966,378.

[51] Int. Cl.[2] .......................... B32B 1/00; B29D 3/00; B29C 17/07

[52] U.S. Cl. .................................... 156/423; 156/556; 425/523; 425/526; 425/530; 425/533; 425/534

[58] Field of Search ............... 425/523, 526, 530, 533, 425/534; 264/530, 537; 156/245, 293, 536, 556, 423; 215/1 C

[56] References Cited

U.S. PATENT DOCUMENTS

| | | | |
|---|---|---|---|
| 3,032,823 | 5/1962 | Sherman | 264/314 X |
| 3,722,725 | 3/1973 | Khetani et al. | 215/1 C |
| 3,759,686 | 9/1973 | Trahan | 65/241 X |
| 3,819,314 | 6/1974 | Marcus | 425/534 X |
| 3,927,782 | 12/1975 | Edwards | 215/1 C X |
| 3,948,404 | 4/1976 | Gollins et al. | 215/1 C |
| 3,966,378 | 6/1976 | Valyi | 425/530 X |
| 4,066,726 | 1/1978 | Mehnert | 425/530 X |

*Primary Examiner*—Jan H. Silbaugh
*Attorney, Agent, or Firm*—Bachman and LaPointe

[57] ABSTRACT

Apparatus for the preparation of hollow plastic articles wherein a more rapid operating cycle is obtained with less effect upon the temperature of the parison. The apparatus includes a first core, means for providing a parison thereon, a temperature controlled first mold engageable with said first core and parison, means for separating the first core from the first mold and parison contained therein, a second core in spaced relationship to the first core, means for transferring the parison to the second core, a blow mold in spaced relationship to said first mold for fully expanding the parison and means for transferring the second core and parison to the blow mold, wherein the blow mold is stationary and the second core with parison thereon is brought into alignment with the blow mold and is inserted therein.

20 Claims, 9 Drawing Figures

APPARATUS FOR THE PREPARATION OF HOLLOW PLASTIC ARTICLES

CROSS-REFERENCE TO RELATED APPLICATIONS

This application is a Continuation-In-Part of United States patent application Ser. No. 641,638, filed Dec. 17, 1975, now U.S. Pat. 4,115,494, which in turn is a Divisional of United States Pat. application Ser. No. 479,287, filed June 14, 1974, now U.S. Pat. No. 3,970,419, which in turn is a Continuation-In-Part of United States patent application Ser. No. 473,580, filed May 28, 1974, now U.S. Pat. No. 3,966,378.

BACKGROUND OF THE INVENTION

This invention relates to the art of blow molding from a parison of articles of organic plastic material susceptible to the improvement of their properties by orientation and has for its principal objects the provision of an apparatus which is characterized by a more rapid operating cycle with less effect upon the temperature of the parison, carrying out the steps of parison production, stretch orientation and circumferential orientation in a single uninterrupted, yet completely controlled sequence, and the provision of improved, oriented hollow articles.

The art teaches various methods and apparatus for obtaining blow molded articles of organic plastic material from a parison, such as in U.S. Pat. No. 3,349,155 and Re. No. 27,104. Generally, these methods are characterized by forming a parison in a parison mold on a blow core, placing said formed parison and blow core into a blow mold and expanding said parison in the blow mold by means of fluid pressure.

While the blow molding operation tends to impart orientation to the article, such orientation is predominantly circumferential, i.e., not bi-axial. Also, the degree of such orientation is difficult to control. It is therefore difficult to obtain the advantageous properties in the article that bi-axial orientation is capable of providing.

It is known that the control of orientation depends largely upon the control of the temperature of the parison just prior to orientation. It is found that such temperature control is best obtained by enclosing the article prior to the orienting step in heating means that impart temperatures, preferably by contact with the corresponding surfaces of the parison, to the regions of the parison corresponding to the degree of deformation that is intended for such regions.

However, art devices that obtain the desirable biaxial orientation are often cumbersome and slow and inconvenient to operate. Also, production rates with such devices are far from optimum.

SUMMARY OF THE INVENTION

In accordance with the present invention, an apparatus is provided for the preparation of hollow articles maintaining substantially consistent temperature control of the articles prior to orientation and/or prior to final expansion, while also obtaining an improved, controlled injection blow molding or stretch blow molding sequence with a rapid operating cycle which has less effect upon the temperature of the parison. The apparatus of the present invention also obtains numerous other significant advantages which will be more readily apparent from the ensuing specification.

The apparatus of the present invention comprises: a reciprocable first core, preferably axially reciprocable, and a temperature controlled first mold, preferably laterally reciprocable; means for providing a parison on said first core; means including said first core to place said parison in said first mold; means for separating said parison from said first core while retaining said parison in said first mold to adjust the temperature thereof; a second core and a second mold in spaced relationship to said first core and first mold, respectively, preferably in lateral spaced relationship, wherein said second core is reciprocable, preferably axially and laterally reciprocable, and wherein said second mold is stationary; means for transferring said parison to said second core and second mold; and means to expand said parison on said second core in said second mold to provide a finished article.

Preferably, the apparatus includes an article removal plug for removing the finished article in integral, spaced relationship to said second core, preferably in lateral spaced relationship, so that when the second core engages the parison in the first mold, the removal plug engages the finished article in the second mold.

In accordance with the apparatus of the present invention, the parison walls may be caused to establish intimate surface contact with the walls of the first mold, such as by forcing said parison in the first mold to conform to the shape of the first mold, such as by expansion. The parison shape may be chosen so as to permit the insertion therein of the second core into intimate surface contact with the inside of the parison. The parison is therefore in full surface contact with the first mold for adjustment of the temperature of the parison, and possibly also in full surface contact with the second core. The temperatures of the first mold, of the second core, or of both, may be controlled to provide optimum conditions in the parison for orientation thereof.

Alternatively, the parison may be stripped from the first core into the first mold without substantially deforming the parison, in which case the shape of the first mold is substantially the same as that of the parison to insure adequate surface contact between the two. At times, the parison may be placed with a heated cavity that does not correspond to the shape of the parison, such heated cavity taking the place of the first mold. This heated cavity is the equivalent of the first mold in the present context and it will be included within the term "first mold" throughout the present specification.

In view of the plural cores and molds used in the present invention and the high degree of temperature control which can be exercised over the parison, the present invention readily obtains a multi-axially oriented article by axially stretching the temperature adjusted parison at a predetermined rate in the second mold by means of the second core and by expanding the parison to form the finished article. Furthermore, the movement parameters of the components of the present apparatus provide a highly efficient and smooth operation.

If it is desired to produce a multi-layered parison and a multi-layered final article, the first core may be provided with a layer of one plastic and a subsequent layer may then be pressure molded therearound in accordance with my U.S. Pat. Nos. 3,349,155, 3,717,544 and 3,719,735. It should be understood, therefore, that where the general description that follows refers simply to parisons, the method and apparatus of the present invention are applicable to multi-layered as well as single-layered parisons.

Thus, a multi-axially oriented article may be readily obtained in accordance with the apparatus of the present invention by providing means for axially stretching the temperature adjusted parison at a predetermined rate and by the expansion of the same, such as by an axially reciprocable portion of the second core that is actuated by means capable of adjusting the speed of reciprocation.

It can be seen that the apparatus of the present invention efficiently and conveniently obtains uniform temperature control of the parison so that the resultant article is characterized by highly improved properties, while obtaining a high production rate. It is known that orientation substantially improves the significant properties of plastics, as clarity, impact resistance, strength, resistance to permeation, etc. Among the plastics that can be so improved are polystyrene, polyvinyl chloride, polyolefins, as polyethylene and polypropylene, polyesters, polycarbonates, polyamides, acrylics, fluorocarbon resins, acrylonitrile, and methacrylonitrile polymers. The improved temperature control of the present invention enables one to obtain improved properties and controlled multi-axial orientation in a simple and expeditious manner.

Accordingly, it is a principal object of the present invention to provide an apparatus for the preparation of hollow articles from moldable organic plastic material which enables accurate temperature control and a rapid and expeditious operating cycle.

It is a further object of the present invention to conveniently and expeditiously provide improved articles which are multi-axially oriented under conditions of close control of temperature and deformation rate.

It is a still further object of the present invention to provide an apparatus as aforesaid which provides products possessing reproducibly uniform properties due to orientation.

Other objects and advantages of the present invention will be apparent to those skilled in the art from the description which follows with reference to the accompanying drawings.

DETAILED DESCRIPTION OF THE PREFERRED EMBODIMENTS

Figure 1:
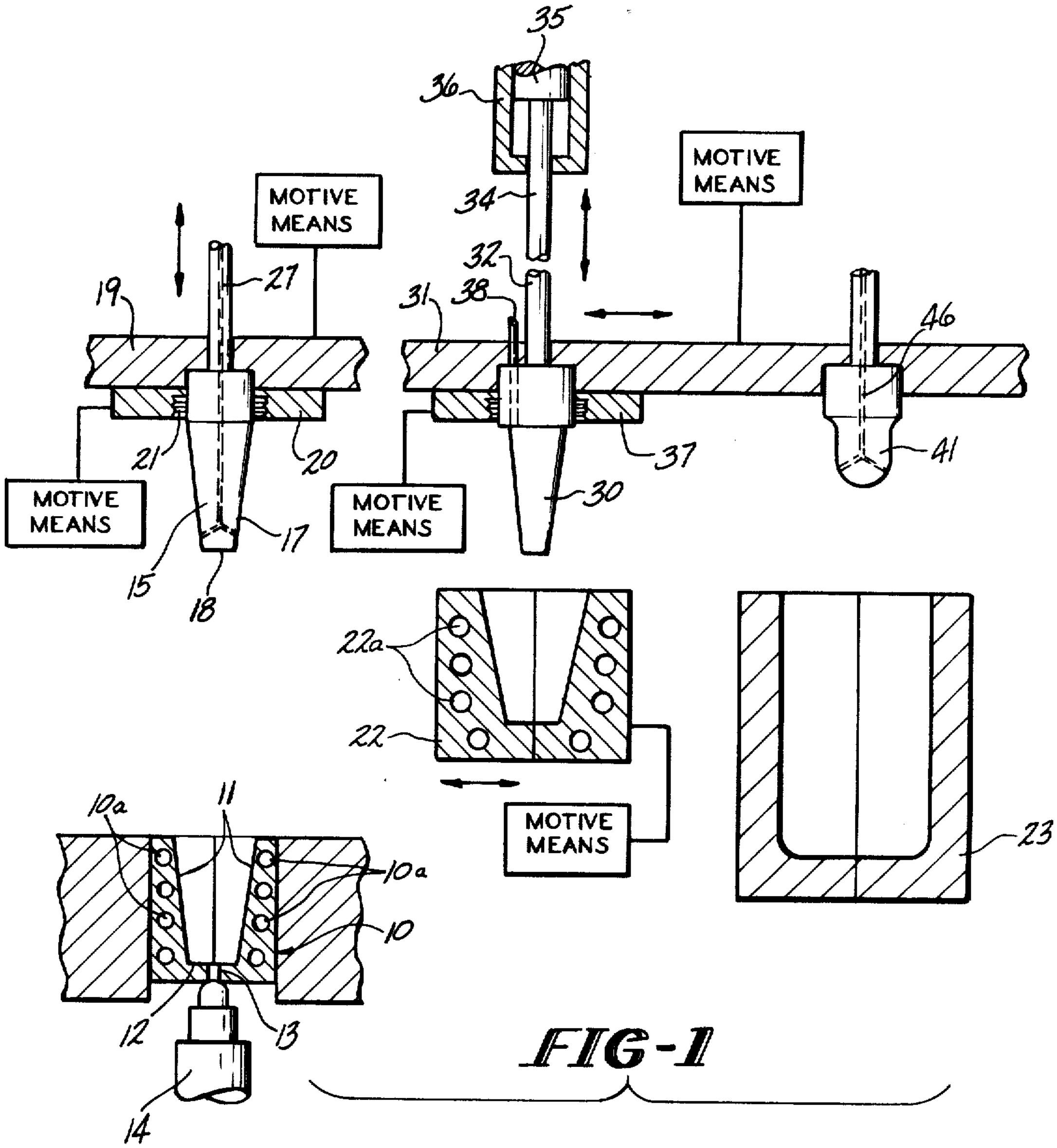
FIG. 1 is an elevation, partly in section, illustrating the apparatus of the present invention.
Figure 2:
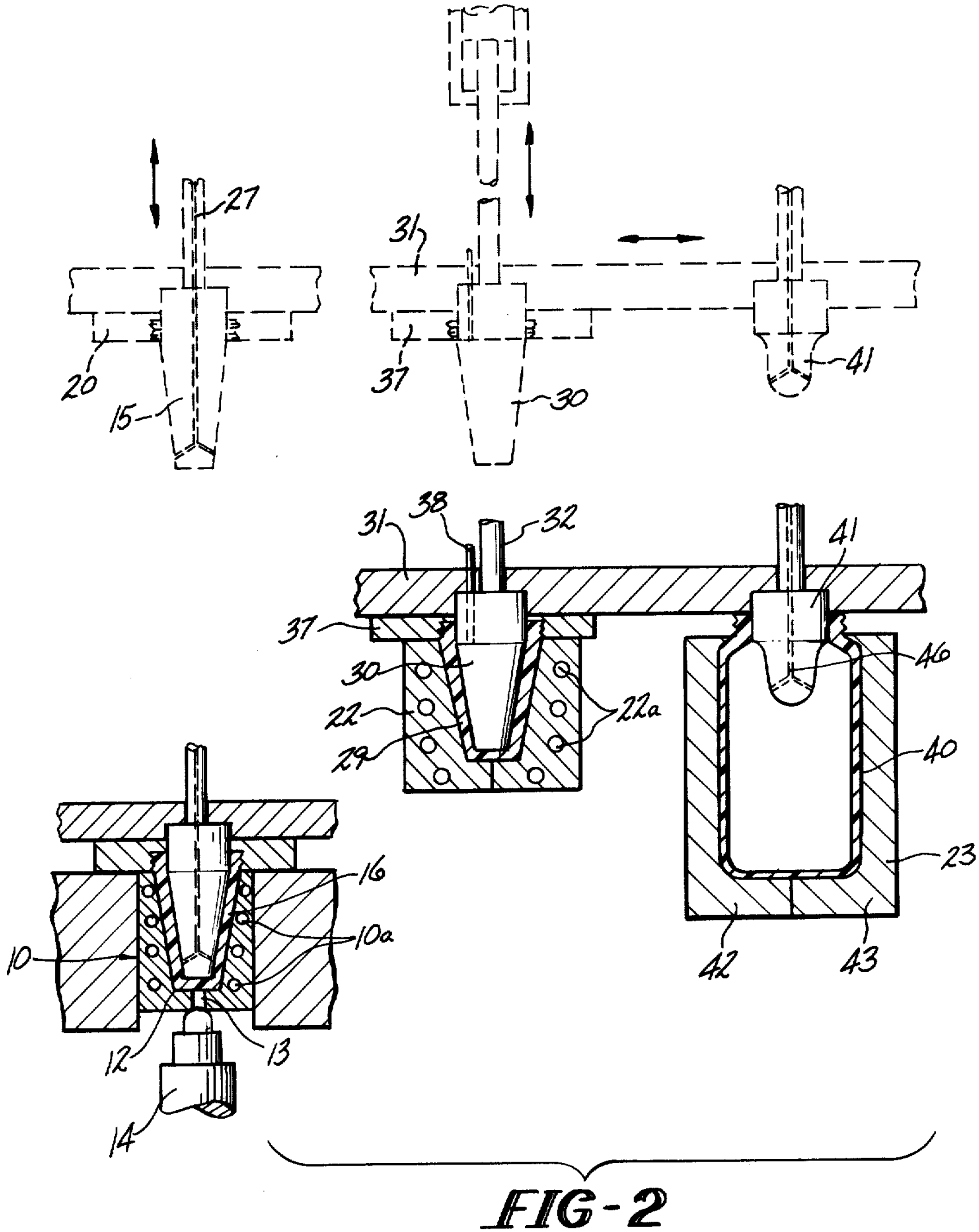
FIGS. 2 and 3 are views similar to FIG. 1 with additional portions in phantom showing a sequence of operations according to an embodiment of the present invention.
Figure 3:
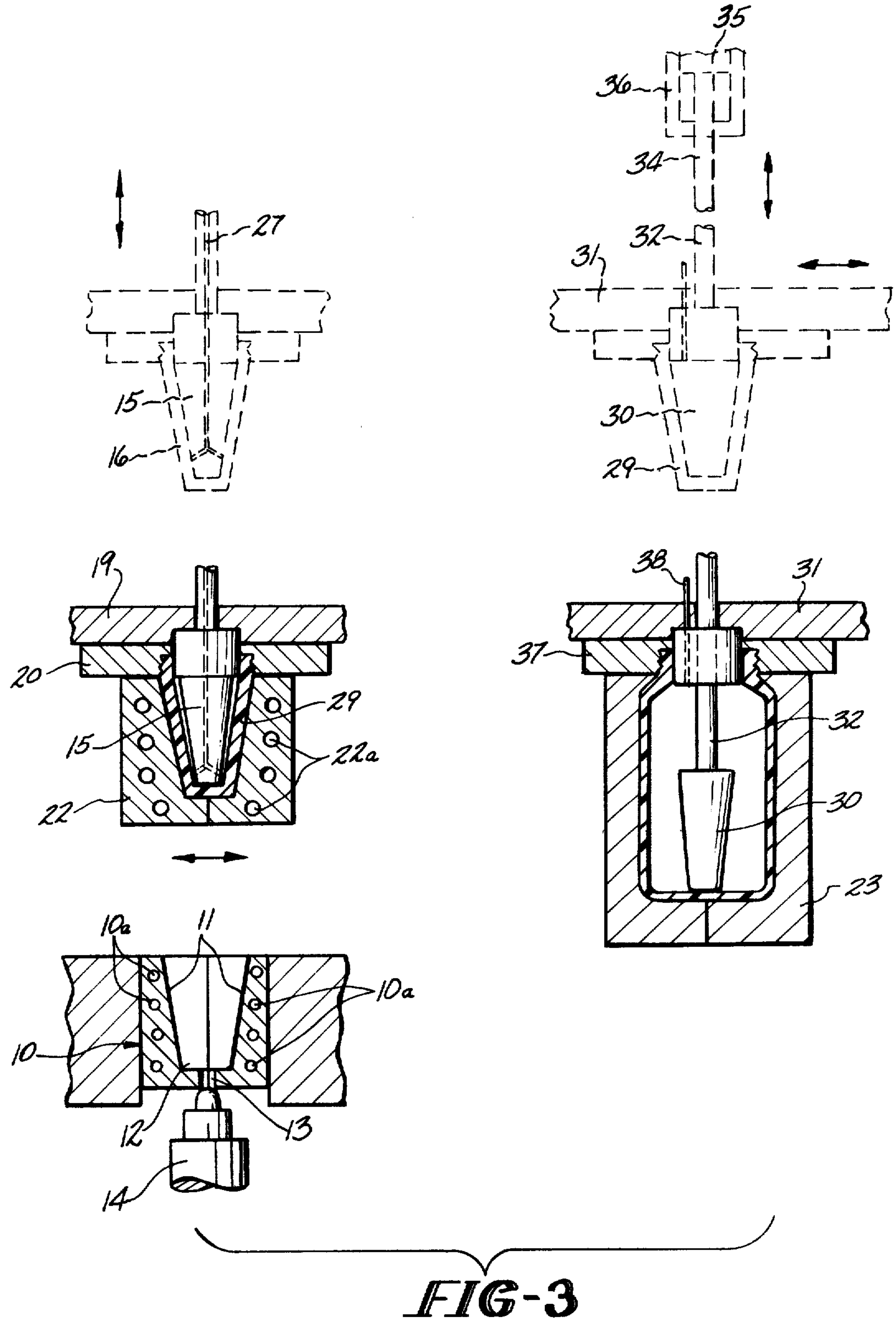

Referring to the drawings, in more detail, FIGS. 1, 2 and 3 illustrate an apparatus in accordance with one embodiment of the present invention. In this embodiment, the parison is provided by an injection molding process; however, the invention is not limited thereto and includes other known molding processes that are capable of producing parisons such as compression molding, casing, extrusion with or without secondary operation, and the like. FIG. 1 depicts a parison die 10, having outer walls 11 which may be separable, depending upon the shape of the parison and which are adapted to form the outer surface of the parison, and having an end wall 12 shaped to form the end wall of the parison. The parison die 10 may be temperature controlled, such as by heating or cooling elements 10a contained therein which are connected to appropriate heat transfer sources (not shown) whereby such temperature control may be arranged in several zones to obtain different temperatures in different regions of the parison. The end wall 12 of the parison die has an injection opening 13 registering with an injection nozzle 14 through which the organic plastic material is injected into the parison die. The parison die 10 is shown as split for convenience in opening to release the formed parison; however, it should be understood that the invention is not limited thereto, as one-piece dies suitably designed for release of the parison are encompassed herein.

As indicated hereinabove, the plastics contemplated in accordance with the present invention are the moldable organic plastic materials and preferably those whose properties are improved by orientation, such as the polyolefins, polyethylene, polypropylene and copolymers thereof, polyvinyl chloride, polystyrene and othr styrenic resins, acrylonitrile, methacrylonitrile, polyvinylidene chloride, polycarbonates, polyesters, polyamides, fluorocarbon resins, etc.

The formation of the parison in accordance with the embodiment illustrated in FIGS. 1, 2 and 3 takes place after a first core 15 (preferably a blow core) illustrated in FIG. 1, and set forth in phantom in FIGS. 2-3, and die 10 are brought into engagement by suitable mechanical means such as the motive means shown schematically in FIG. 1. In the embodiment shown in FIGS. 1, 2 and 3, core 15 is axially reciprocable in the direction of the arrow into and out of engagement with die 10. Upon completion of injection through nozzle 14, a parison 16, having substantially the configuration represented in FIG. 2, is formed.

Side wall 17 and an end 18 of core 15, walls 11 and 12 of parison die 10, and the neck mold 20 constitute a die cavity in which the parison is formed. Core 15 may be temperature controlled in one or more zones, such as by internal heat exchange circuits known in the art contained therein, which are connected to an appropriate heat transfer or power source (not shown). Core 15 is carried by platen 19. This assembly further includes a neck mold 20 in which the neck of the parison is formed and which remains engaged with the parison while the latter remains on blow core 15 after disengagement from the parison die, which neck mold may be independently temperature controlled. The neck mold may possess threads 21 for defining a threaded opening in the final molded object. The neck mold 20 may be split and opened into two portions by suitable mechanical means such as the motive means shown schematically in FIG.

1, to release the parison, or, if the configuration of the neck permits, may be of one piece construction and, thus, separable from the parison as a unit.

During separation of the parison die 10 and the core 15, the parison 16 is sufficiently retained thereon by means of neck mold 20, or by other means, such as an undercut, if necessary. Upon separation, the parison assumes the position depicted in FIG. 1 and shown in phantom in FIG. 3.

First mold 22, which is a conditioning, i.e., tempering mold and may be a pre-forming mold, and core 15 are brought into alignment so as to juxtapose first mold 22 and parison 16, illustrated, as noted earlier in phantom in FIG. 3. As shown, first mold 22 is laterally reciprocable by suitable mechanical means, such as the motive means shown schematically in FIG. 1, with the first mold moving in the direction of the arrow into and out of alignment with core 15. Mold 22 is temperature controlled, frequently in multiple zones which may be disposed along the length thereof, as by heating or cooling elements 22a which are connected to appropriate heat transfer sources (not shown). It is possible, although not preferred, to align first mold 22 and parison 16 by lateral or circular reciprocation of core 15.

Referring to FIG. 3, upon the alignment of first mold 22 and core 15 bearing parison 16, core 15 and parison 16 are then placed within first mold 22, for example, by the axial reciprocation of core 15. Other means of engaging parisons and molds may be used and are well known, such as those disclosed in U.S. Pat. Nos. 2,853,736 and 2,974,362. The parison is then released from first core 15 into first mold 22, as by stripping it axially which may be facilitated, if desired, by partially expanding the parison. The partial expansion is carried out by arranging for the mold cavity of mold 22 to be a small fraction of an inch larger than the parison and by applying fluid pressure through channel 27 on the inside of the parison thereby expanding the parison into conformance with the cavity of mold 22. Passage 27 is provided within core 15 and may terminate at a valve-like, closeable portion of the core well known in the art. Separation of the parison from core 15 may then be facilitated by air-pressure stripping of the parison from the core, with removal of the core from the parison leaving the parison in mold 22. It should be noted that such expansion is not always necessary, but is often helpful as in the example shown. If desired, an exit channel (not shown) may be provided on mold 22 to permit the removal of air from the mold cavity as the parison enters facilitating the establishment of contact of the parison with the mold walls.

The temperature of first mold 22 is controlled by heating or cooling means 22a connected to appropriate heat transfer sources (not shown), or by electric heaters, to optimize the parison temperature for subsequent operations in a manner to be described below. Naturally any suitable heating or cooling means may be used in any of the heating or cooling coils described herein, such as a passage containing heat transfer fluid maintained at a suitable temperature, electric resistance heaters or radiant heat sources.

FIG. 3 illustrates the pressure molded parison 16 as conformed to the shape of the mold cavity in first mold 22, for example, by the exertion of fluid pressure, with the partially expanded parison labeled 29. At times the shape of partially expanded parison 29 may be made such that a second core, e.g., stretch-blow core 30, may be inserted into substantially complete surface contact therein, as shown in FIG. 2, permitting heat exchange throughout, by contact of the second core and the parison. In such an instance, the said shape should exhibit no undercuts or reverse curves on the inside surface, for example, due to an outward taper over its inside surface. However, the parison shape does not always permit this, for example, in some cases of long, narrow-necked parisons, in which cases it may be necessary to forego contact heating the inside of the parisons.

After completion of the transfer of the parison into first mold 22, that mold and first core 15 are separated as by moving the first core plus first neck mold axially in the direction of the arrow, usually accompanied by the application of air pressure at the inside of the parison by means of the first core, and the parison 20 thus transferred is retained in first mold 22. Core 15 and neck mold 20 are then returned to the starting position as illustrated in FIG. 1, and first mold 22 containing the parison 29 which may be partially expanded, is shifted laterally into the position illustrated in FIGS. 1 and 2.

Parison 29, which is retained within first mold 22, is thereby transferred into alignment with a second core 30 which is carried by platen 31 and which may be provided with temperature control means, and which may have an external configuration shaped to conform to the internal configuration of the parison 29. Whenever axial stretching of the parison is desired, core 30 will include a stretch and blow assembly which comprises a mandrel extension 32 which is reciprocable as indicated by the arrow in FIG. 1 to axially extend the parison 29. An actuating means is shown which comprises a push rod 34 which engages extension 32, and which is connected to a piston 35 housed within a cylinder 36 which may, for example, be responsive to hydraulic pressure exerted by a pump, not shown. By controlling the flow of fluid into cylinder 36, the speed of piston 35 and therefore of the movable portion of core 30 may be controlled to stretch the parison at the speed best suited for the temperature of the parison. Such actuating means is merely illustrative of one manner of operation, as other actuating means known in the art can be employed herein. If a highly oriented article is not desired, the axial extension operation may be dispensed with.

Figure 1A:
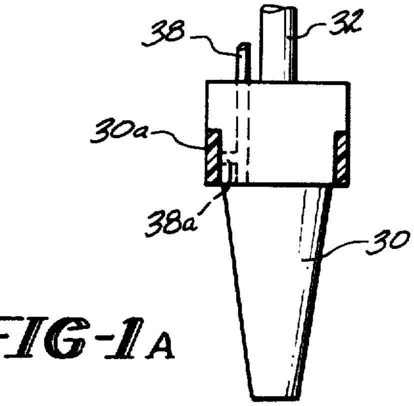
FIG. 1A shows a core modification in the apparatus of FIG. 1.

For the final forming sequence, the parison is separated from first mold 22 by retaining it at the neck region on core 30 and, at times, also on a neck mold 37 which operates in the same manner as neck mold 20. In the absence of neck mold 37, one may retain parison 29 on core 30 by close fit of core 30 within the neck of the parison, or, as shown in FIG. 1A, by providing an expendable sleeve 30a made of an elastomer or the like at the neck region of core 30 arranged to grip the neck of the parison internally, whereby such a sleeve may be caused to expand by air pressure brought to it from the core, as through fluid passageway 38.

Core 30 is situated in spaced relationship to core 15, and first mold 22 is situated in spaced relationship to second mold 23, to enable both cores to engage a respective mold when core 15 is aligned with mold 22 as shown in FIG. 3. This facilitates the concurrent pursuit of both the tempering and final forming processes with separate parisons. Further, and with regard to the transfer of parison 29 to core 30, it should be noted that parison die 10 is spaced from first mold 22, as illustrated in FIGS. 1 and 2, so that core 15 may engage with die 10 to form another parison while core 30 engages with first mold 22 and also while a third core 41 ejects the fully expanded article 40. The ability to concurrently conduct the various operations of the process outlined herein comprises one of the notable advantages of the invention. The simultaneous formation, transfer, or final expansion and finished article removal of a plurality of parts in envisioned, as the apparatus illustrated in the accompanying figures can be further modified to provide additional intermediate molds and cores, such as mold 22 and core 30.

A fluid passageway 38 is provided and terminates at the end surface of that portion of the core 30 which does not move during the movement of extension 32. Fluid passageway 38 also connects to a source of fluid under pressure, not shown. Accordingly, fluid may enter the space inside parison 29 during final expansion, discussed hereinafter, once passageway 38 is opened by movement of the extension 32 and correspondingly of the movable portion of core 30. If the transfer of the parison out of first mold 22 is to be facilitated by gripping the parison from the inside as shown in FIG. 1A, elastic sleeve 30a is pressurized from its inside surface by means of pressure air through secondary passageway 38a causing the sleeve to expand against the inner half of the parison neck.

In the instance where core 30 may be made to conform to the inner contour of parison 29, it can be seen that core 30 may be heated or cooled. Thus, the temperature of parison 29 may be adjusted by heat exchange between both the inner and outer surfaces of parison 29 and the corresponding mold and core surfaces.

The parison 29 is thereby rapidly and uniformly prepared for further processing, such as axial extension and final expansion. This is a considerable advantage since it avoids the problem of parison cooling during a multistep process. Whenever core 30 may be made to conform to the shape of parison 29, the heat transfer conditions may be further improved over the ones prevailing if only the outer surface of parison 29 is in heat transfer relation with a corresponding mold element. Naturally, the conventional temperature regulators that are used to control the heating means of core 30 and mold 22 are able to do so individually, in several zones within the assembly, corresponding to the desired temperature profile.

In the interest of a rapid operating cycle, it is particularly advantageous to first rapidly alter the heat content of parison 16 by heat exchange with core 15 and mold 10 to result in a heat content desired for subsequent operations, but almost always at the cost of an unequal distribution of temperature in said parison. This must be followed by substantially equalizing the temperature distribution across the wall thickness of said parison by heat exchange with mold 22 and, whenever made to conform with the inner wall of the parison, with core 30, to avoid a layer-wise pattern of properties in the finished article corresponding to the known relationship between such properties and the deformation temperatures. This procedure is described in more detail in my copending U.S. Pat. application Ser. No. 810,081, now U.S. Pat. No. 4,116,606. Thus, for example, one can form parison 16 by injection molding, rapidly cool said parison by heat exchange with core 15 and mold 10 which will result in a rapid cycle, but will also produce said unequal temperature distribution, followed by substantially equalizing the cross-sectional temperature distribution of said parison, all in a controlled manner, to impose thereon the temperature profile desired for orientation. Naturally, the parison remains in mold 22 until the necessary desired temperature distribution adjustment is obtained. Alternatively, in accordance with the present invention, a pre-formed parison may be placed in mold 10, heated rapidly in mold 10 by heat exchange with mold 10 and core 15, which is also apt to produce said unequal temperature distribution, and further treated in mold 22 by heat exchange with mold 22 and core 30 to substantially equalize the temperature distribution of said parison. The foregoing provides the considerable advantages of enabling the attainment of a predetermined temperature profile of the parison resulting in optimum conditions for orientation without excessive dwell time in the molds. The parison mold is freed for further use while the first mold is completing the conditioning of the parison, resulting in an expeditious processing cycle.

Referring to FIG. 2, the transfer of parison 29 to finishing mold 23 is conducted by core 30 which is in engagement with first mold 22 and parison 29. Core 30 with parison 29 thereon is separated from first mold 22, which may be split to release parison 29, by moving core 30 axially by suitable mechanical means such as the motive means shown schematically in FIG. 1. Upon release, core 30 with parison 29 thereon returns to the position illustrated in FIG. 1 and depicted in phantom in FIG. 3.

In accordance with the apparatus of the present invention, the second mold 23 is in lateral spaced relationship to said first mold 22, with the second mold being fixed. The fixed or stationary position of the second mold represents a significant advantage of the apparatus of the present invention. It permits the placement of the parison much more rapidly and hence with less effect upon its temperature. Also, second mold 23, if it is a multi-impression mold (which is often the case) is apt to weigh several tons. The movement of such a mass with great speed requires elaborate, expensive and not altogether efficacious means to control acceleration and deceleration of the movement; whereas, the parison with the core assembly weighs but a few pounds and may be moved swiftly by simple means, e.g., cushioned-end air cylinders.

As can be seen in FIGS. 1 and 2, a third core or article removal plug 41 for removing the finished article is in integral, lateral spaced relationship to second core 30, with both the second and third cores being carried on platen 31. Therefore, when the second core engages parison 29 in second mold 22, the removal plug 41 engages the finished article 40 in the second mold 23. As shown by the arrows, the second and third cores are axially and laterally reciprocable so that the second core transfers parison 29 from mold 22 to mold 23 by a combination of axial, lateral and axial movements. Simultaneously, third core 41 removes the finished article from mold 23, which may be split and separable to facilitate the extraction of the finished article, and transfers same to an ejection station located laterally of mold 23 (not shown) for removal of the finished article while core 30 engages mold 23.

Core 30 carrying parison 29 is then received in mold 23, with the temperature of parison 29 having been adjusted as described above. Parison 29 is usually axially extended to the bottom of mold 23 by the advancement of the movable portion of mandrel 32 by means of push rod 34 at a predetermined rate. Thus, the present invention may controllably stretch the parison longitudinally before final blowing and thereby produce orientation in the axial direction as well as the orientation subsequently produced by blowing. It can be seen that the temperature of the parison preparatory to stretching and blowing may be properly and conveniently controlled by the respective molds and core. While stretching occurs, passageway 38 is kept open to provide pressure equalization of the inside of the parison with the atmosphere to prevent collapse of the parison due to the vacuum created inside it as its inside volume increases during stretching.

After completion of axial extension, the parison is fully expanded to conform to the configuration of finishing, i.e., second mold 23, to form the final object 40 which, in the embodiment illustrated herein, is an open-ended container. Naturally, a wide variety of shapes may be prepared as the commercially known shapes which may be a bottle, a jar or a cup-shape. Full expansion is accomplished by supplying fluid under pressure through passageway 38 into the interior of axially extended parison 29, or at times and at various rates, into the interior of the parison while it is being extended.

After full expansion is completed, second core 30 and second mold 23 containing final object 40 are separated as described hereinabove with reference to first core 15 and first mold 22. The second core is moved axially, laterally and axially, which positions the second core in the first mold 22 and at the same time positions removal core 41 in finished article 40 for removal of same after the finished article has cooled sufficiently for that purpose.

In the embodiment illustrated herein, finishing mold 23 is longitudinally split into two sections labeled 42 and 43, which may reciprocate in and out of communication by an actuating means, not shown, such as for example a hydraulic cylinder. Thus, sections 42 and 43 may be parted an amount sufficient to permit the removal of article 40 by core 41 which may be inserted into the neck thereof with a tight fit. Prior to such opening of mold 23 and removal, fluid pressure may be applied through passageway 46 to continue the blowing process, if desired, in cases requiring continued contact of article 40 with second mold 23 for the purpose of extended cooling. Alternatively, passageway 46 may be utilized to continue to supply cooling air to the inside of the finished article, or to apply suction to the inside of the finished article to aid in retaining same thereon.

Thus, it can be seen that the present invention improves the injection blow molding process and carries out the steps of parison production, stretch orientation and circumferential orientation in a single uninterrupted and completely controlled sequence. The parison is injected or provided in a first station and is moved axially from the first station on a first core. The parison is then transferred by the first core into a first or tempering mold which is shifted laterally into alignment with the first core for that purpose. The first mold is then shifted laterally with the parison therein into a second station wherein a second core is inserted into the parison and the second core with parison thereon is moved axially away from the first mold. The second core with parison thereon is then shifted into alignment with the second mold and inserted therein for final processing into a finished article, with the finished article being ejected by a third or ejection core.

The apparatus and process of the present invention is simple, convenient and progressive in nature. The parison moves from the injection mold to first core; from first core to tempering mold; from tempering mold to a second core which may be a stretch-blow core; from second core to finishing mold and out; or preferably from finishing mold to a third ejection core and out. The movement of components is quite simple and convenient and expeditious, with the large, bulky finishing mold being stationary.

The temperature adjustment of the parison afforded by the present invention has been found to provide an oriented product having consistently good properties. The parison is injected into a comparatively cool mold and left there for a very short time, long enough to remove the amount of heat from the parison that corresponds to the condition best suited for orientation. The parison is then transferred into a tempering mold which imparts the optimum orientation temperature distribution to the given plastic article, staying in that mold long enough to equalize the temperature across the wall thickness of the parison which naturally arrives from the injection mold with a poor cross-sectional temperature profile. After tempering, the parison, now having the right temperature profile with good cross-sectional distribution, is transferred into a cool finishing mold in which it is stretched at a controlled rate and blown. The steps of injection plus dwell in the injection mold; of tempering and of stretch-blowing with cooling overlap; and of article removal, occur at the same time allowing for efficient machine utilization. Also, the component movements allow for smooth operation.

Naturally, many variations may be included. Injected or blown necks may be made. The stretch function may be omitted, in which case a very efficient injection blow molding operation is provided. Instead of tempering, the second station may be used as a first blow station and the third station may be used as a second blow station in order to divide the cooling dwell between the two. This may be desirable in the case of thick-walled articles. In fact, additional cooling stations may be added.

In one modification, the parison may be formed earlier at a time and location of its own and stored before being formed into the final article. In addition to injection molding, numerous methods are known that may be employed to provide thermoplastics in the shape of a parison, such as tube extrusion with welding of one open end, dipping, deposition, thermoforming and the like. Thus, the previously formed parison may be transported to and placed upon a first blow core which cooperates with a heating means to raise the temperature of the parison sufficiently to enable it to undergo deformation.

Secondary operations often need to be performed upon the hollow article made in accordance with the present invention. Among these is the application of a base cup to the articles having a domed bottom as is frequently the case with bottles that have to withstand appreciable internal pressure, e.g., carbonated beverage bottles. These base cups are usually plastic dish-like objects with a flat bottom, the inside of the dish often being glued to the convex bottom of the bottle so as to render it capable of standing upon a flat surface. These base cups are usually applied in a special device to which bottles that have been previously made are randomly presented.

Figure 4:
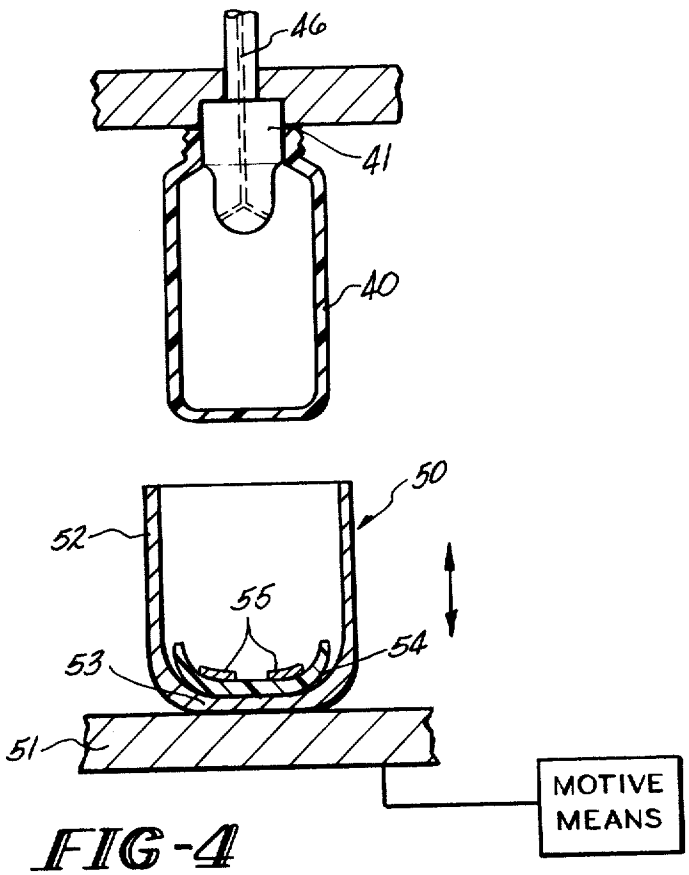
FIG. 4 is a partial view similar to FIGS. 1-3 showing a modification of the apparatus of the present invention.

In accordance with the improvement illustrated by the modification of FIG. 4, it is possible to dispense with such a separate device and instead to integrate the base cup applicator into the apparatus itself. In accordance with the embodiment of FIG. 4, a base cup applicator is provided for applying a base cup to the base of the finished article, with the applicator being located in lateral spaced relationship to the second mold so that when the second core and parison engage the second mold (FIG. 3) the applicator carrying a base cup engages the base of the finished article on the removal plug. As shown in FIG. 4, base cup applicator 50 is carried by a suitable platen 51 which may be movable in the direction of the arrow by suitable motive means. The applicator includes a sleeve portion 52 and a bottom base cup carrier 53. In operation, carrier 53 is loaded with a base cup 54 by conventional means, not shown. The base cups may be provided with adhesive 55 at predetermined, spaced locations for adhering to the bottom of the finished article. The base cups carried by applicator 50 are then engaged with the base of the finished article 40 with sleeve 52 surrounding the finished article to keep same from buckling outwards. Air pressure may be supplied inside the finished article by passageway 46 in core 41. Pressure is then applied to carrier 53 in the direction of the arrow pressing cup 54 firmly against the base of the bottle 40. Upon completion of the requisite setting times for the adhesive 55, if used, the applicator is removed from the finished article 40 now equipped with a base cup 54, and the article is stripped from the plug 41.

Figure 5:
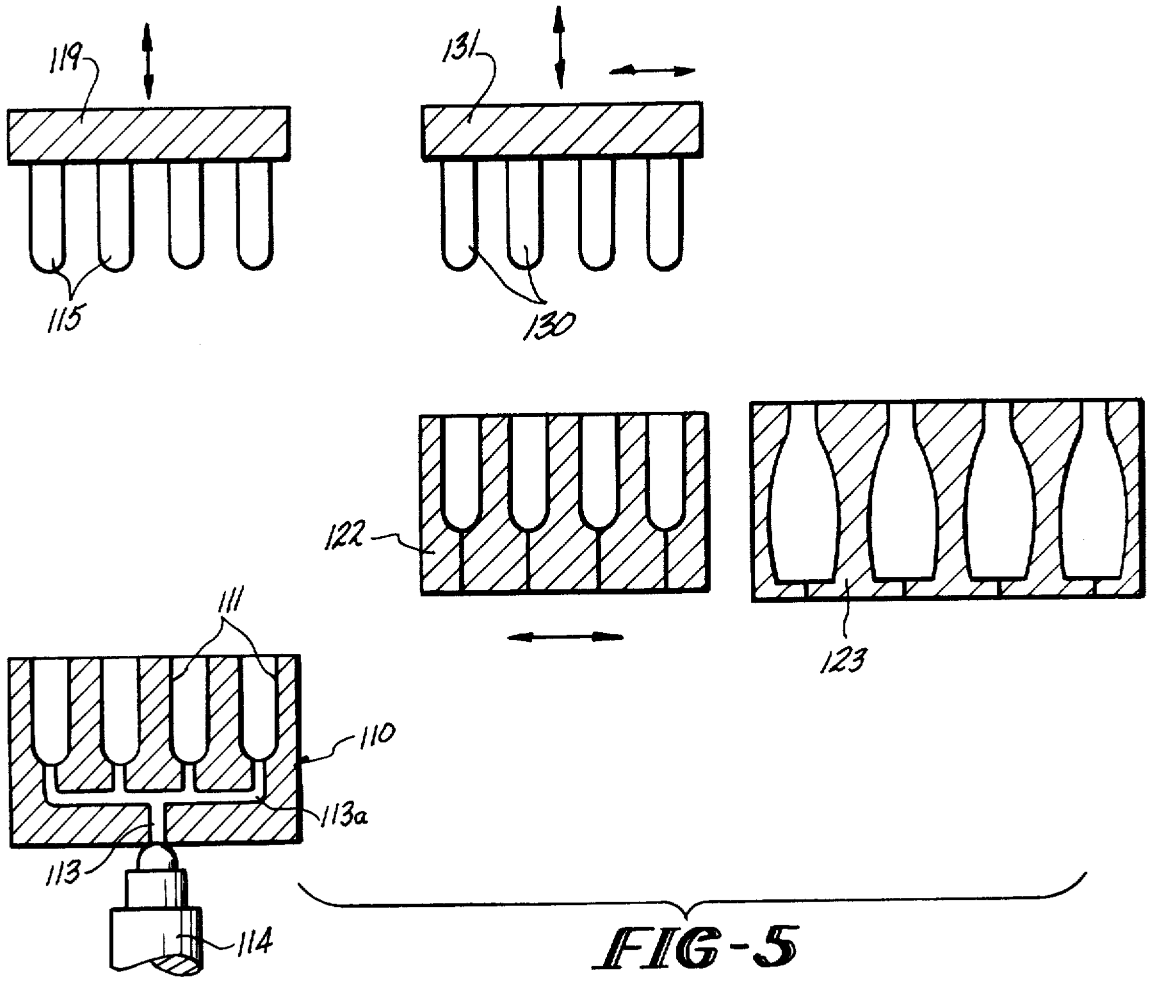
FIG. 5 is a schematic elevation similar to FIG. 1 showing a plurality of cores and molds.
Figure 5A:
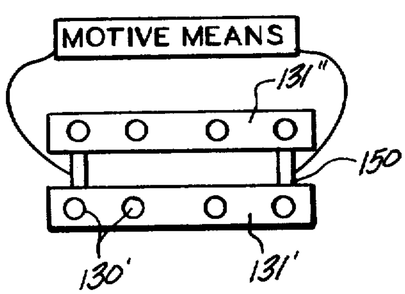
FIGS. 5A and 5B are schematic top views of the second cores showing a variation of the embodiment of FIG. 5.
Figure 5B:
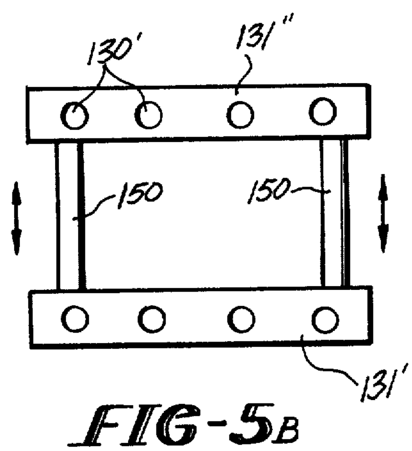

It is well known that in injection molding it is desirable to minimize the length over which molten plastic is made to flow and also to group individual cavities in injection multicavity molds so as to minimize the platen space which helps accuracy in molding due to the reduced hazard of deflecting the support structure of the mold under the great forces of injection. As shown in the schematic diagrams of FIGS. 5, 5A and 5B which utilize an apparatus according to FIGS. 1, 2 and 3, an apparatus is provided including a plurality of first cores in spaced relationship to each other carried by a common carrying means, a plurality of first molds in spaced relationship to each other carried by a common carrying means, a plurality of second cores in spaced relationship to each other carried by a common carrying means, and a plurality of second molds in spaced relationship to each other carried by a common carrying means, wherein a plurality of the finished articles are made simultaneously. Naturally, the molds may be split for convenience of article or parison removal. As shown in FIG. 5, the cavities 111 in multiple parison mold 110 are arranged in a row cooperating with first cores carried on common carrying means or support plate 119. The parison die 110 cooperates with injection unit 114 through which molten plastic is injected through channel 113 distributed by runner 113*a*. The spacing between cavities 111 corresponds to the dimensions of the parisons. Accordingly, the spacing of the second cores 130 carried by common carrying means or platen 131 must correspond to that of the cavities 111 if the parisons made in cavities 111 are to be transferred in the manner shown in FIGS. 1, 2 and 3. The parisons are then transferred through the processing cycle in a manner after FIGS. 1, 2 and 3 utilizing a plurality of first molds 122 and a plurality of second molds 123.

Hollow articles to be made from parisons are frequently much larger than the parisons and hence cannot be accommodated with the same center spacing as the parisons. For example, the parison for a large bottle may have a diameter of approximately $1\frac{1}{2}$ inches, while the bottle made from the parison may measure 4 inches in diameter. In accordance with the embodiment of FIGS. 5A and 5B, which represents a schematic top view of the second cores in two different positions, means are provided for moving said second cores away from and towards each other in a predetermined relationship. The apparatus according to FIGS. 5A and 5B accommodates the larger center spacing of the finished article while preserving the compact arrangement in the parison mold as in FIG. 5. Two rows 131′ and 131″ of second cores 130′ are provided to mate with two corresponding rows of parisons (not shown). Means are provided to spread the two rows of second cores, such as spreader bars 150 connected to any suitable motive means, in the direction of the arrows. Thus, once the parisons carried by second cores 130′ complete the tempering cycle in the first molds (the position shown in FIG. 5A) and the parisons are separated therefrom, the spreader bars 150 are moved to spread the second cores 130′ to the center lines of the finishing cavities of the second molds (to the position shown in FIG. 5B). After stretching and blowing in the second molds, the second cores are removed from the hollow articles and moved together again to the center lines of the first molds to resume the next cycle.

Figure 6:
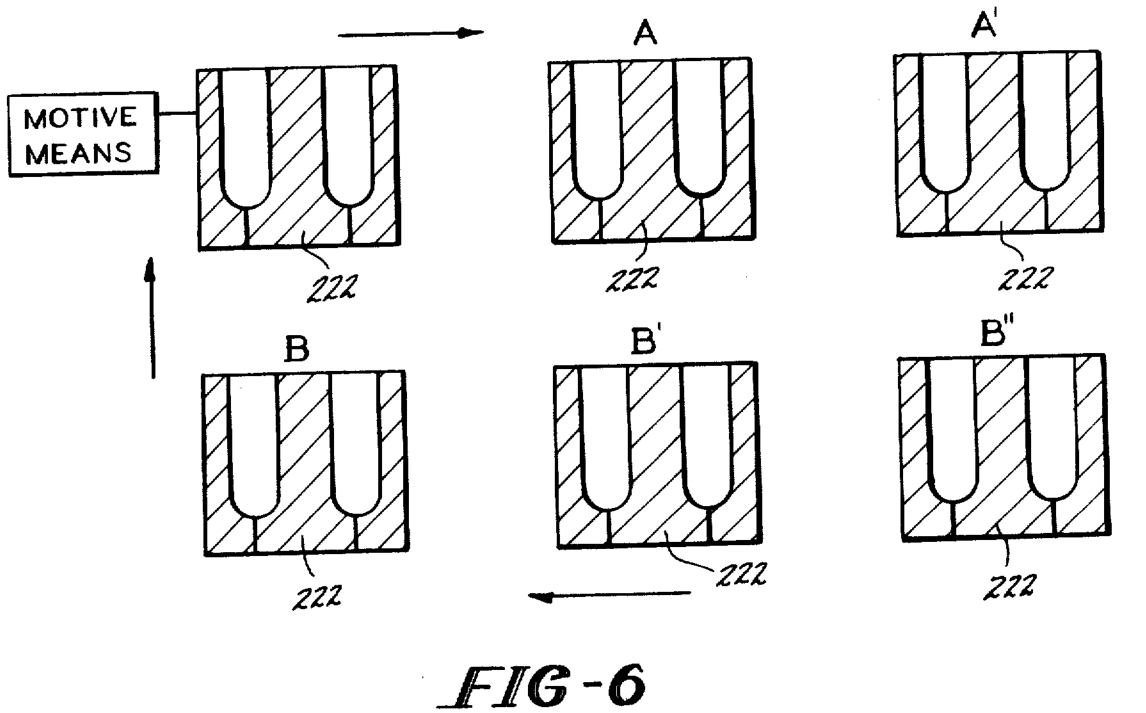
FIG. 6 is a schematic view showing a plurality of first cores in a variation of the apparatus of the present invention.

FIG. 6 shows a further improvement aimed at handling parisons made of plastics that require a prolonged tempering cycle prior to bi-axial orientation by stretching and blowing. Among these plastics, polypropylene being the most prominent, tempering cycles in terms of minutes are called for, in contrast to tempering cycles measured in seconds that are needed in connection with other materials. The problem in connection with an apparatus for this type of material is to introduce an extended tempering cycle without at the same time prolonging the actual operating cycle of the device and without constructing extremely bulky and inefficient heating apparatus. FIG. 6 schematically shows an apparatus which accomplishes the foregoing by including a plurality of first molds movable into positions spaced from the cores for extended adjustment of the temperature of the parison. In the embodiment shown in FIG. 6, a multi-tier arrangement is provided in the tempering station showing a plurality of first molds 222. In operation according to FIGS. 1, 2 and 3, when a mold 222 with the parison reaches the tempering station it is side-shifted by conventional motive means to neighboring position A. In a next cycle, it may be further side-shifted into an adjoining position A′, and so on, whereby the number of such side positions will depend upon the actual tempering cycle desired. As illustrated in FIG. 6, upon reaching position A′, the tempering mold is moved to a lower tier, i.e., into position B″, from whence it is moved further into position B′, and from there to position B, from which position it is elevated into the original upper tier, i.e., into the position at which mold 222 had originally entered the tempering cycle. Positions A, A′, etc. and B, B′, etc. may of course be arranged at either side, or both sides of the tempering station. It can be readily seen that by means of this simple side-shift and elevator device, the parisons may be given any extended tempering desired without impeding the overall operating cycle of the machine. Thus, the machine output will remain the same regardless of the tempering dwell provided that a sufficient number of tempering molds are used. Naturally, all molds in circulation may be connected to a source of energy, for example, in the case of electric heating, electric power may reach each mold over a sliding connector cooperating with suitable conventional bus bars.

In accordance with the embodiment of FIG. 6, the parisons arriving in the first or tempering mold are not removed therefrom by the second cores, but prior thereto, the first mold is side-shifted to give an extended tempering cycle while keeping the parisons under controlled temperature conditions. The length of time for this dwell will depend upon the number of molds that are in circulation. The removal of the tempered parison may occur at position B.

Instead of the preferred device for using a multiplicity of tempering molds as above described, it is conceivable to move a multiplicity of first molds along different paths, for example, in a circle, which may be vertical or horizontal. However, care must be taken to keep the parisons in a vertical position to avoid their distortion and to keep the molds in contact with temperature control units.

In summary, in accordance with the embodiment of FIG. 6, an apparatus is provided for forming objects of moldable plastic material requiring prolonged tempering cycles to obtain conditions suitable for orientation, said apparatus including a multiplicity of tempering molds for retaining parisons prior to orientation, whereby the tempering molds receive and release the parisons seriatim and whereby the overall cycle of the apparatus is substantially unaffected by the number of the tempering molds. Preferably, the apparatus is of the type shown in FIGS. 1, 2 and 3.

As indicated hereinabove, in connection with the discussion of FIG. 4, secondary operations can if desired be performed at the ejector station. One illustration of these secondary operations is the attachment of a base cup 54 to the finished article 40 by means of a base cup applicator 50. Naturally, other secondary operations may readily be performed at the ejector station as shown in my previous U.S. Pat. Nos. 3,336,425 and 3,587,133, for example, one may fill the finished article while said article is confined by means of the base cup applicator 50 or other suitable means to confine the walls of the finished article while said article is being filled. This procedure will enable one to readily hot fill the finished article and, if desired, maintain the filled article confined until cooled sufficiently to handle.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An apparatus for forming objects of moldable organic plastic material which comprises: a first core and a first mold spaced from each other wherein said first core and first mold are engageable with each other; means for providing a parison on said first core engageable with said first core at a location spaced from the location wherein said first mold and first core are engageable with each other; means including said first core to place said parison in said first mold; means associated with said first core for separating said parison from said first core while retaining said parison in said first mold to adjust the temperature thereof; a second core and a second mold in spaced relationship to said first core and first mold, respectively, wherein said second core is reciprocable into and out of engagement with said second mold and wherein said second mold is stationary; means for engaging said second core and first mold with parison retained therein at a location spaced from said second mold whereby said parison is transferred to said second core; means for moving said second core and parison retained thereon into engagement with said second mold at a location spaced from said first mold; and means associated with said second core to expand said parison on said second core in said second mold to provide a finished article.

2. An apparatus according to claim 1 wherein said first core is axially reciprocable, said first mold is laterally reciprocable and said second core is axially and laterally reciprocable.

3. An apparatus according to claim 2 wherein said first core is solely axially reciprocable and wherein said first mold is solely laterally reciprocable.

4. An apparatus according to claim 1 including an article removal plug for removing the finished article in integral, spaced relationship to said second core so that when said second core engages the parison in said first mold, the removal plug engages said finished article in said second mold.

5. An apparatus according to claim 4 including a base cup applicator for applying a base cup to the base of the finished article, said applicator being in lateral spaced relationship to said second mold so that when said second core and parison engage the second mold, the applicator engages the base of the finished article on the removal plug.

6. An apparatus according to claim 5 wherein said applicator includes a sleeve portion which surrounds said finished article when the applicator engages the finished article.

7. An apparatus according to claim 1 including an expandable sleeve at the neck region of at least one of said cores arranged to grip the neck of the parison internally.

8. An apparatus according to claim 1 including a plurality of first cores in spaced relationship to each other carried by a common carrying means, a plurality of first molds in spaced relationship to each other carried by a common carrying means, a plurality of second cores in spaced relationship to each other carried by a common carrying means, and a plurality of second molds in spaced relationship to each other carried by a common carrying means, wherein a plurality of said finished articles are made simultaneously.

9. An apparatus according to claim 8 wherein means are provided for moving said second cores away from and towards each other in a predetermined relationship.

10. The apparatus according to claim 1 including means engageable with said first core for molding said parison on said first core.

11. An apparatus according to claim 1 wherein said second core is a blow core and fully expands the parison in said second mold.

12. An apparatus according to claim 1 including means for axially extending the parison in said second mold to provide a final article which is multi-axially oriented.

13. An apparatus according to claim 1 including a plurality of first molds movable into positions spaced from said cores for extended adjustment of the temperature of said parison.

14. An apparatus according to claim 1 including an ejector station for ejecting the finished article in lateral spaced relationship to said second mold, and means for performing secondary operations on said finished article at said ejector station.

15. An apparatus according to claim 1 including means associated with said first core for separating the parison from the first core while in the first mold.

16. An apparatus according to claim 15 wherein said means for separating the parison conforms the parison to the shape of the first mold upon being separated from the first core.

17. An apparatus according to claim 1 wherein said second core is a blow core and fully expands the parison in said second mold, and wherein said apparatus includes means for axially extending the parison in said second mold prior to fully expanding to provide a final article which is multi-axially oriented.

18. An apparatus according to claim 1 wherein said first mold is temperature controlled.

19. An apparatus according to claim 1 wherein said first core is reciprocable into and out of engagement with said first mold.

20. An apparatus according to claim 1 wherein said first mold provides a temperature controlled environment for influencing the temperature of the parison without conforming same to the shape thereof.

* * * * *